United States Patent
Nicoulin et al.

(10) Patent No.: US 8,463,883 B2
(45) Date of Patent: Jun. 11, 2013

(54) METHOD FOR UPDATING AND MANAGING AN AUDIOVISUAL DATA PROCESSING APPLICATION INCLUDED IN A MULTIMEDIA UNIT BY MEANS OF A CONDITIONAL ACCESS MODULE

(75) Inventors: Andre Nicoulin, Lausanne (CH); Corinne Le Buhan, Les Paccots (CH); Serge Philip, La Ciotat (FR)

(73) Assignee: Nagravision S.A., Cheseaux-sur-Lausanne (CH)

( * ) Notice: Subject to any disclaimer, the term of this patent is extended or adjusted under 35 U.S.C. 154(b) by 627 days.

(21) Appl. No.: 12/364,535

(22) Filed: Feb. 3, 2009

(65) Prior Publication Data

US 2010/0077390 A1    Mar. 25, 2010

(30) Foreign Application Priority Data

Feb. 11, 2008 (EP) ..................... 08151281

(51) Int. Cl.
*G06F 15/177* (2006.01)
(52) U.S. Cl.
USPC ........................................ 709/221
(58) Field of Classification Search
USPC .......................... 709/221; 717/171
See application file for complete search history.

(56) References Cited

U.S. PATENT DOCUMENTS

| | | |
|---|---|---|
| 6,256,741 B1 | 7/2001 | Stubblebine |
| 6,360,320 B1 | 3/2002 | Ishiguro et al. |
| 6,438,690 B1 | 8/2002 | Patel et al. |
| 6,443,361 B1 | 9/2002 | Klatt et al. |
| 6,636,975 B1 | 10/2003 | Khidekel et al. |
| 7,039,802 B1 | 5/2006 | Eskicioglu et al. |
| 7,146,412 B2 * | 12/2006 | Turnbull ....................... 709/220 |
| 7,225,164 B1 | 5/2007 | Candelore et al. |
| 7,310,732 B2 | 12/2007 | Matsuyama et al. |
| 7,380,133 B2 | 5/2008 | Jaquier |
| 7,424,613 B2 | 9/2008 | Han et al. |

(Continued)

FOREIGN PATENT DOCUMENTS

| | | |
|---|---|---|
| AU | 751436 | 11/1999 |
| DE | 10 2005 060 288 | 6/2007 |

(Continued)

OTHER PUBLICATIONS

"Functional model of a conditional access system" by EBU Project Group B/CA, EBU Technical Review 1995, pp. 64-77.*

(Continued)

*Primary Examiner* — Ryan Jakovac
(74) *Attorney, Agent, or Firm* — DLA Piper LLP US

(57) ABSTRACT

A method to force a multimedia unit to update an application for viewing broadcast conditional access content by linking said update to an update of the conditional access module firmware. The firmware update is initialized by means of version information transmitted in the content stream. In particular, this version information may be included in ECM or EMM messages or in services information tables in order to be processed by the conditional access module independently from the multimedia unit. The version information comprises of a minimum version and of an available maximum version. If the conditional access module detects that the current version of the firmware is inferior to the available maximum version, it transmits a message requesting an update of the application that initiates downloading a firmware updating from a management center. The update installation is carried out simultaneously in the conditional access module and in the multimedia unit.

17 Claims, 1 Drawing Sheet

U.S. PATENT DOCUMENTS

| | | | |
|---|---|---|---|
| 7,720,351 B2 | 5/2010 | Levitan | |
| 7,895,663 B1 | 2/2011 | Rao et al. | |
| 7,934,212 B2 * | 4/2011 | Lakhdhir | 717/170 |
| 8,028,332 B2 | 9/2011 | Le Buhan et al. | |
| 8,165,916 B2 | 4/2012 | Hofferg | |
| 2001/0020241 A1 | 9/2001 | Kawamoto et al. | |
| 2003/0041127 A1 | 2/2003 | Turnbull | |
| 2003/0154378 A1 | 8/2003 | Hirano | |
| 2004/0125959 A1 | 7/2004 | Beuque et al. | |
| 2005/0075986 A1 | 4/2005 | You et al. | |
| 2005/0209970 A1 | 9/2005 | Shiba et al. | |
| 2006/0020784 A1 | 1/2006 | Jonker et al. | |
| 2006/0200814 A1 | 9/2006 | Kontinen et al. | |
| 2007/0174617 A1 | 7/2007 | Carrel | |
| 2007/0256090 A1 | 11/2007 | Hiron et al. | |
| 2007/0256126 A1 | 11/2007 | Erickson et al. | |
| 2008/0247544 A1 * | 10/2008 | Candelore et al. | 380/241 |
| 2009/0070754 A1 * | 3/2009 | Ichikawa | 717/168 |
| 2009/0113414 A1 * | 4/2009 | Hamilton | 717/173 |

FOREIGN PATENT DOCUMENTS

| | | |
|---|---|---|
| DE | 10 2006 016 121 | 4/2008 |
| EP | 1 078 524 | 8/2002 |
| EP | 1 326 173 | 7/2003 |
| EP | 1 624 692 | 2/2006 |
| EP | 1 811 778 | 7/2007 |
| EP | 1 914 990 | 4/2008 |
| FR | 2872662 | 1/2006 |
| WO | WO 9856179 A1 * | 12/1998 |
| WO | WO 03/107589 | 12/2003 |
| WO | WO 2004/056116 | 7/2004 |
| WO | WO 2004/112004 | 12/2004 |
| WO | WO 2005/124583 | 12/2005 |
| WO | 2007/120892 A3 | 10/2007 |

OTHER PUBLICATIONS

"DVB Conditional Acess" by David J. Cutts, Electronics and Communication Engineering Journal, Feb. 1997, pp. 21-27.*

Eskicioglu, A., et al., "An overview of multimedia content protection in consumer electronics devices", Signal Processing: Image Communication 16, pp. 681-699, 2001.

European Search Report issued in EP 08 15 1281 dated Aug. 21, 2008.

Abstract of EP 1 811 778 published Jul. 25, 2007 with machine generated English translation.

Abstract of DE 10 2006 016 121 published Aug. 30, 2007 with machine generated English translation.

English Language Abstract of DE 10 2005 060 288 published Jun. 21, 2007.

English Language Abstact of WO 99/57901 (family member of EP 1 078 524) published Feb. 28, 2001.

European Search Report issued in EP 07 10 3634, dated Jul. 23, 2007.

English language abstract of FR 2,872,662, published Jan. 6, 2006.

U.S Appl. No. 11/373,214.

U.S. Appl. No. 12/043,665.

* cited by examiner

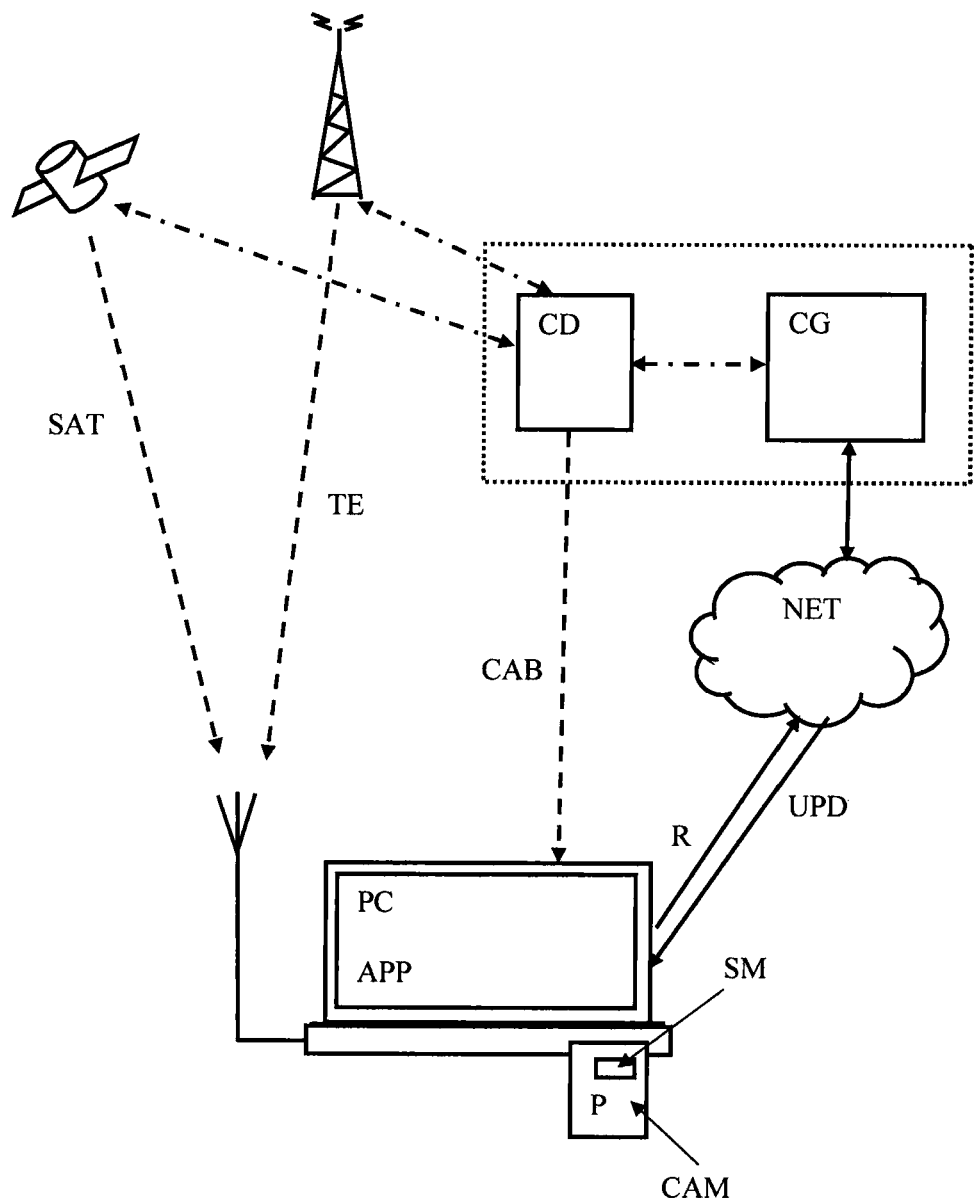

METHOD FOR UPDATING AND MANAGING AN AUDIOVISUAL DATA PROCESSING APPLICATION INCLUDED IN A MULTIMEDIA UNIT BY MEANS OF A CONDITIONAL ACCESS MODULE

FIELD OF THE INVENTION

The present invention relates to the domain of multimedia units comprising an application for processing conditional access audiovisual data streams broadcast by terrestrial transmitters, satellites, cable or via a broadband and high data throughput network wired or wireless of the type WiFi, Wimax, UMTS etc.

TECHNICAL BACKGROUND

The multimedia units are defined herein as desktop or portable personal computers, digital television decoders, television sets or portable phones etc. to which a conditional access and decryption module is connected. More particularly, the object of the invention concerns the updating and managing the software of the conditional access module as well as the data streams processing application installed in the multimedia unit.

Many digital television decoders, as well as television sets with an integrated digital receiver and personal computers equipped with adequate interfaces, use a conditional access module CAM (Conditional Access Module) to control access to the broadcast audio/video digital data and to descramble these data. Typically, this module is in form of a detachable standardized case provided with a smart card reader and a connector compatible with an interface of the computer. An example is described in the U.S. Pat. No. 6,443,361. Such a CAM module provided by a Pay-TV operator descrambles one or more audio/video data streams coming from a cable, a terrestrial radio waves transmitter, a satellite, an Internet server via a wired or wireless communication network (WebTV, IP TV) with keys or control words received from an element dedicated to the conditional access. This element, in charge of the security of the decryption of the descrambling keys and conditional access rights, consists generally of a tamper-proof smart card or security module, inserted in the reader of the conditional access module CAM, wherein user rights are stored. Messages included in the broadcast streams consisting of control messages ECM (Entitlement Control message) and rights administration messages EMM (Entitlement Management Message) are directed towards the security module storing the transmission keys necessary for decrypting these messages. The control words (CW) included in the control messages ECM are decrypted, and, returned to the descrambling module if and only if the conditional access rights are present and verified by the security module.

A CAM module is generally connected to the host multimedia unit via a common interface DVB-CI (Digital Video Broadcasting-Common Interface) defined by the European Standard EN50221 "Common Interface Specification for Conditional Access and other Digital Video Broadcasting Decoder Applications" edited by the CENELEC (European Committee for Electrotechnical Standardization). This document describes a common interface while standardizing the data structure, the channel coding, the service information, and the interface with the host unit and with the conditional access system. The latter is used to control the access to a broadcast service consisting of a set of elementary streams offered to the user in a form of a television program for instance. According to this document, the CAM module carries out applications by communicating with the host unit and providing to the user functionalities complementary to those included in the host unit such as the conditional access system or an electronic program guide. Furthermore, it is compatible with the PCMCIA format (Personal Computer Memory Card International Association), USB (Universal Serial Bus) or others.

According to a compact configuration, the CAM module may be in form of a "dongle" or an electronic key comprising both the security module and the decryption module integrated in one or more electronic circuits. This "dongle" is connected to a port of the computer for communication towards external peripherals such as the parallel port, the USB serial port, the IEEE1394 Firewire port, etc. An example of application of a "dongle" for the access control to encrypted data is described in the document US2007256126.

The multimedia unit comprises a particular application of the type Windows Media Player, Real Player, VLC Media Player etc. intended to use or view the content of the broadcast data obtained after decoding. This application is secured in association with the conditional access module CAM in order to control records, transfers or copies of the content on local or distant supports to prevent abuses. Moreover, it is not desirable to allow a third application to process the received data without the authorization of the broadcaster or, the operator controlling the access to this data.

A standard such as CableCard (SCTE41 www.scte.org) can be used to secure the audio-visual data stream between the conditional access module and the multimedia unit. Nevertheless, such a solution needs rigorous and secured management of the keys and algorithms within the multimedia unit, which is difficult to ensure over a long period particularly in the case of open architectures which may be used on personal computers.

Therefore, it is desirable to guarantee a reliable and secure coupling of the application or the operating software installed in the multimedia unit processing the decrypted content with the software or firmware of the secured conditional access module CAM.

SUMMARY OF THE INVENTION

The aim of the present invention is to force the updating of the multimedia unit application by means of a conditional access module CAM in, order to constantly maintain the dependence between the application and the CAM module firmware. In other words, a firmware updating of the CAM module forces an updating of the multimedia unit application. It is thus possible to force an updating of the security mechanisms of the multimedia unit by means of the updating mechanisms of the CAM module firmware.

This aim is reached by a method for updating and managing an audiovisual data processing application included in a multimedia unit, by means of a conditional access module controlling the access to the encrypted audiovisual data broadcast in a transport stream via a broadcast network and controlled by a broadcast center and/or a management center, all or part of said data being returned by the conditional access module and transmitted to said audiovisual data processing application, said conditional access module using a firmware having a current version for processing and returning the data to the application,
the method is characterized in that it comprises the following steps:
  receiving by the conditional access module information on the maximum available and the minimum required versions of the conditional access module firmware, reading the information on the minimum version required and comparing with the current version of the conditional access module firmware, reading the information from the maximum version available and comparing with the current version of conditional access module firmware, when the comparison gives a result indicating that the maximum available version is superior to the current version of the firmware loaded on the conditional access module, transmitting to the application an invitation message for updating the firmware, updating of said firmware to the maximum available version or at least to a version higher or equal to the minimum version according to the following steps.

a) transmitting an updating command by the conditional access module to the multimedia unit, b) receiving the updating command by the multimedia unit and transmitting an updating request to the management center, via a communication network, c) downloading from the management center by the multimedia unit the updating data comprising the conditional access module firmware and the updating data for the multimedia unit application, d) installing the conditional access module firmware, and the updating data for the multimedia unit application.

when the comparison gives a result indicating that the minimum version required is superior to the current version of the firmware loaded on the conditional access module, deactivation of the audiovisual data access control functions and transmitting to the application an error message reporting the necessity of updating the firmware, according to steps a) to d).

The aim of the method is to force the updating of the firmware to the maximum available version even if the conditional access module can work correctly with a minimum firmware version. An updating to the minimum version is in fact imperative so that the conditional access module is able to carry out the stream descrambling operations in order to render the broadcast contents accessible to a user of the multimedia unit by means of the application.

According to an embodiment of the method, when the required minimum version is superior to the current firmware version, the firmware updating can be carried out directly to the maximum available version. The step of comparing the current version with the maximum and minimum versions will thus give a result indicating that the current version is superior to the minimum version and equal to the maximum version. Therefore, no invitation message for updating the firmware will be displayed.

The minimum and maximum version information of the conditional access module firmware is inserted either in one or several ECM control message or in one or several entitlement management messages EMM, either in services information tables such as defined by the ETSI EN300468 standard, either in specific messages or tables broadcast in the transport stream.

This version information is read and processed by the conditional access module alone, independently of the type of multimedia unit and of the installed audiovisual data processing application. The multimedia unit thus operates as a slave of the conditional access module during the operations of firmware and application updating.

Thus in particular, a malicious user cannot use the multimedia unit alone for deviating the updating messages broadcast in the transport stream the conditional access module itself should be modified for this purpose.

In addition, the firmware updating upon request of the application to the management center allows the latter to control the authentication of the application and of the multimedia unit hosting the application during this operation. An additional legitimacy control is thus carried out.

Moreover, the application is matched to the firmware by means of keys, security algorithms and/or specific communication protocols that are typically renewed during a common updating of the application and firmware version. This matching prevents a third application, which is not recognized by the broadcasters for example, to be able to exploit the data returned by the conditional access module. Conversely, a conditional access module coming from a second multimedia unit will not be recognized by an application implemented in a first unit with a first module having a different firmware version.

BRIEF DESCRIPTION OF THE DRAWING

The invention will be better understood thanks to the following detailed description referring to the enclosed drawing given as a non limitative example.

FIG. 1 shows a block diagram of a multimedia unit equipped with a conditional access module and receiving the access controlled data broadcast from a terrestrial transmitter, a satellite or a cable. The multimedia unit is also connected, via a communication network, to a management center.

DETAILED DESCRIPTION OF THE INVENTION

The data reception system of controlled access digital audio video contents in the example of FIG. 1 comprises a multimedia unit PC in form of a portable or a desktop computer equipped with a conditional access module CAM including a security module SM. The conditional access module CAM operates thanks to a firmware P of a given current version in association with a software application APP such as Windows Media Player, Real Player, VLC Media Player etc. installed in the computer and able to present broadcast audio video content data to a user. This content data is broadcast by means of terrestrial transmitters TE and/or satellites SAT and/or through a cable CAB in form of transport stream FT to the multimedia unit equipped with appropriated reception means. A broadcasting center CD organizes the stream FT by integrating therein data necessary for the access control provided by a management center CG. It should be noted that the broadcasting center CD and the management center CG can be gathered in a single and same entity.

According to an embodiment, this stream FT is forwarded into a broadband wired or wireless communication network of Internet type with high data throughput to which the computer is connected. This broadcasting mode is known as WebTV or IP TV or Internet television.

The stream FT also contains conditional access messages such as control messages ECM and access rights administration messages EMM. According to an embodiment, upon, reception of the stream by the computer PC, the viewing application APP carries out a first filtering of the audiovisual data before transmitting said data to the conditional access module CAM. The latter descrambles the data by means of control words extracted from the control messages ECM and decrypted by the security module SM according to rights stored therein. The data thus processed are generally re-ciphered with a session key associated to the application APP before being returned to said application APP for viewing.

The computer PC has a return channel via a communication network NET towards a management center CG including servers and databases and connected to the broadcasting center CD. This channel allows the transmission to the management center CG, besides various requests for updating the software associated with the computer PC and its applications, a request R for updating the firmware P of the conditional access module CAM. The return channel, independent from the stream broadcasting channels, generally uses the protocol IP (Internet Protocol) for the transmission of data from the computer towards the management center CG.

The firmware P of the CAM module is defined herein by one or several components comprising either the operation software of the CAM module, either one or more keys, one or more encryption/decryption algorithms, either interfaces, drivers and communication protocols with the application APP installed in the computer associated with the CAM module and various other parameters, and/or operation variables. An updating UPD of the firmware P becomes necessary when one or more of these software components change or upgrade towards an improved version in respect to the current version, even when a key, an algorithm or a parameter etc. changes. The motivation of this updating may be functionalities improvements or more generally security improvements.

The firmware P can also contain information on the type, the version and parameters necessary for the compatibility of the application with the CAM module. The firmware P may include a complete updating intended to replace all the components forming the current firmware P, either the firmware P may include one or several separated components such as, for example one or several keys, algorithms, parameters or variables intended to renew only the corresponding concerned components of the firmware P that has or have evolved.

When an update UPD of the firmware P is available, the management center CG introduces the version information data corresponding to the firmware P version reached once the updating has been carried out. The version information data comprise a reference to the minimum version required for the normal reception of the transport stream data formatted to be readable by the conditional access module CAM software and a reference for an available maximum version. The maximum version is either superior or equal to the minimum version. In the latter case, the conditional access module will stop working until the updating is effective, which involves unacceptable constraints in most cases regarding the number of simultaneous updating requests to be processed by the management center as well as the service cessation for the users of the application. The difference between the available maximum version and the required minimum thus constitutes an adjusting means available to the management center according to its particular constraints such as spreading over time the number of updating requests According to an embodiment of the invention, a grace period can be associated to the minimum version in order to prevent overload of the updating requests when the transmitted minimum version is superior to the current version of many conditional access modules. This grace period may be a duration related to the reception of the message by the conditional access module, or a fixed date and/or hour. This grace period can be pre-programmed in the current version of the firmware or transmitted by a message broadcast together with the version information data.

The version information data can be transmitted either in specific updating messages M either in the ECM control or EMM management messages broadcast in the controlled access data stream according to the DVB standards, see for example the document "Functional model of a conditional access system", EBU Project group B/CA.

It can also be transmitted in services information tables such as defined by the standard ETSI EN300468. This document entitled Digital Video Broadcasting (DVB); Specification for Service Information (SI) in DVB Systems published by the ETSI describes the structure of service information SI. The standard ISO/CEI 13818-1 MPEG-2 "Information technology—Generic coding of moving pictures and associated audio information: Systems" defines the specific information of programs PSI (Program Specific Information).

The PSI data allow configuring the conditional access CAM module associated to the APP application of the multimedia unit PC in an automatic way for demultiplexing and decoding the different programs and services of the transport stream FT.

These PSI data are structured in four types of tables that are transmitted in sections, namely.

Program Map Table (PAT) Program Association Table:

It indicates for each service of the multiplex the location i.e. values of packet identifiers PID (Packet identifier) of packets of the transport stream of the corresponding programs organization table PMT (Program Map Table). It also provides the location of the network information table NIT (Network Information Table).

2) Conditional Access Table Cat (Conditional Access Table)

It provides the data specific to conditional access systems used in the multiplex comprising the location of the management message stream. EMM (Entitlement Management Message).

3) Program Map Table PMT Program Map Table)

It identifies and indicates the locations of streams comprising each service and the location of the program clock reference fields for a service.

4) Network Information Table Net (Network Information Table)

Its location is defined according to the standard ISO/CEI 13818-1 MPEG-2, the data format being not comprised in this standard. It provides information about the physical network such as transmitters designation (radio or satellite-based) allowing finding other transport streams in the network.

The specific program information PSI is completed by the data allowing the user to identify the services and the events transported in a multiplex or in a network. These data are distributed in tables such as:

The Bouquet Association Table BAT (Bouquet Association. Table) providing in addition to the bouquet name (set of programs or services made available to users by a broadcaster), the list of services available in each bouquet. This table is facultative.

The service description table SDT (Service Description Table) containing data for describing services such as the names and the service providers.

The information about the program contents is present in the events information tables EIT (Event Information Table) referring to each service from its identification according to the DVB standard. This information describes the different programs by proposing information similar to that found in a traditional TV program magazine.

The above mentioned tables each include at least one section reserved for additional data that may be inserted by the broadcaster, for instance the information of minimum and maximum version of the CAM module firmware P.

For security reasons, the integrity of this version information, whatever its transmission mode is, i.e. by ECM control message, EMM management message, specific message or by service information tables, has to be verified by the conditional access module CAM. In order to prevent modification of the version information by the application APP or other software installed in the multimedia unit, it is preferably accompanied with its signature constituted by a digest of the information obtained by a mathematical unidirectional hashing function and ciphered with a key known by the CAM module or the security module SM.

According to an embodiment, this version information is encrypted by means of a key known by the CAM module or the security module SM.

After reading the version information, the conditional access CAM module firstly compares its current version with the reference to the minimum version of the firmware P able to ensure the decryption of the data of the transport stream.

In case of a difference highlighted by a current version inferior to the read minimum version, the functions of access control to the audiovisual data of the conditional access CAM module are deactivated while rendering the CAM module unable to decrypt the data of the stream. The CAM module then transmits an error message to the application APP that displays it on the screen of the multimedia unit and warning the user about the necessity of updating the firmware P. A command is also transmitted to the multimedia unit PC, which sends a request R for downloading an update, to the management center CG, via the communication network NET. The management center CG transmits to the multimedia unit PC, after verification of the request R, the updating data UPD preferably encrypted and signed with a key known by the CAM module or the security module SM. The encryption and the signature are used to prevent all abusive replacement of the firmware P by downloading from a third server not recognized by the broadcaster.

The downloading of the firmware P update can be carried out, either manually by transmitting a command, for example, in form of a click on an appropriate button in response to the message displayed on a screen connected to the multimedia unit, or entirely automatically, without any user intervention, upon reception of the command by the multimedia unit.

At end of downloading, the installation of the updated firmware P is carried out simultaneously on one hand in the conditional access module CAM and on the other hand in the application APP of the multimedia unit PC. This installation process, as the one of downloading, can also be carried out manually by a command or automatically.

After the step of installing the update of the firmware P in the conditional access CAM module and the data issued from the firmware P serving to update the application APP in the multimedia unit PC, the audiovisual data access control functions of the firmware P of the conditional access module CAM are reactivated. The updating of the current firmware P is then carried out at least to a minimum version.

The updating of the firmware P of the conditional access CAM module and the updating data of the application APP of the multimedia unit PC comprise a secured protocol for communication between the conditional access CAM module and the application APP using an algorithm and ciphering keys and/or an updating of keys matching the firmware P with the application APP.

The matching is for instance carried out according to the mechanism described in the document EP1078524B1 wherein the data exchanged between the firmware P of the CAM module and the application APP are ciphered by a unique matching key stored on one hand in the CAM module and on the other hand in the multimedia unit PC.

The firmware P of the conditional access CAM module is matched to the application APP of the PC multimedia unit in order to ensure a common performance of the two parts only with the versions previously installed.

It is thus not possible to update the CAM module independently from the APP application and inversely. In the case that such an installation, of updating cannot be carried out in a synchronous way in the multimedia unit PC and in the conditional access CAM module, the multimedia unit PC or rather the application APP will not be reactivated and will be thus unable to exploit the data of the stream in the expected way. The method according to the invention thus ensures a parallel evolution of the two parts of the firmware P while avoiding any unrecognized applications being able to decipher the data of the broadcasted stream.

The version information contains, in addition to the reference to the required minimum version, a reference to a maximum version of firmware P that it would be advantageous to download in the CAM module. When this maximum version is superior to the current and minimum versions, a message is displayed on the multimedia unit screen inciting the user to a subsequent downloading of the new version. The latter is not absolutely necessary for the correct performance of the set formed by the application of the multimedia unit and the conditional access module CAM. The maximum version can also correspond as well to a version superior to the minimum version providing additional functionalities as to the last available version of firmware P. In this case, the CAM module remains activated unlike the case where the current version is detected as being inferior to the minimum version.

According to an embodiment, in order to encourage the users to download the maximum version, and when this is superior to the current and minimum versions, the performance of the set application—conditional access module CAM may be altered or limited to the decryption of a restricted number of audio/video channels of the transport stream.

The method according to the invention thus allows updating the firmware in two times when the current version is inferior to the minimum and maximum versions. Contrarily to the obligation of updating to the minimum version, the updating to the maximum version is recommended. Thus, a multimedia unit equipped with a minimum version CAM module can work for some time without connection to the communication network NET providing the updating even if the version information indicates the availability of a maximum version.

This minimum performance period can be terminated either by the user replying to the updating invitation message after connection of the multimedia unit to the communication network NET, or by the broadcaster. The latter replaces, in the version information, the reference for the minimum version with the reference for the maximum version. This operation allows the broadcaster to deactivate the CAM modules whose firmware does not correspond to the available maximum version. Thus an updating to the maximum version becomes necessary, as the current version is inferior to the minimum version that corresponds in this case to the maximum version that the broadcaster wants to impose.

The invention claimed is:

1. A method for updating and managing an audiovisual data processing application included in a multimedia unit, by means of a conditional access module controlling the access to encrypted audiovisual data broadcast in a transport stream via a broadcast network and controlled by a broadcast center or a management center all or part of said data being returned by the conditional access module and transmitted to said audiovisual data processing application, said conditional access module using a firmware having a current version for processing and returning the data to the application, the method comprising the steps of;

receiving by the conditional access module information indicating a maximum available version of the conditional access module firmware and a minimum required version of the conditional access module firmware, wherein the version information of the firmware is transmitted ciphered with a key known by the conditional access module and not known by the multimedia unit;

decrypting by the conditional access module the version information of the firmware using the key known by the conditional access module;

comparing by the conditional access module the information on the minimum required version with the current version of the conditional access module firmware;

comparing by the conditional access module the information from the maximum available version with the current version of conditional access module firmware;

when the comparison of the information on the maximum available version with the current version of the conditional access module firmware gives a result indicating that the maximum available version is superior to the current version of the firmware loaded in the conditional access module, transmitting by the conditional access module to the application an invitation message for updating the firmware;

synchronously updating said firmware to the maximum available version or at least to a version higher or equal to the minimum version and audiovisual data processing application according to the steps of:

a) transmitting an updating command by the conditional access module to the multimedia unit;

b) receiving the updating command by the multimedia unit and transmitting an updating request to the management center, via a communication network;

c) downloading from the management center by the multimedia unit updating data comprising the conditional access module firmware and application update data for the audiovisual data processing application; and d) synchronously installing the conditional access module firmware, and the application update data for the audiovisual data processing application; and when the comparison of the information on the minimum available version with the current version of the conditional access module firmware gives a result indicating that the minimum required version is superior to the current version of the firmware loaded in the conditional access module deactivating audiovisual data access control functions until the firmware is updated;

transmitting to the application an error message reporting the necessity of updating the firmware; and synchronously updating the conditional access module firmware and the audiovisual data processing application in the multimedia unit according to steps a) through d).

2. The method according to claim 1, wherein the firmware of the conditional access module and the application update data for the multimedia unit application have a configuration such that they will not interoperate if one is updated without updating the other.

3. The method according to claim 1, wherein the audiovisual data access control functions of the firmware of the conditional access module are reactivated after the installation of the conditional access module firmware and the application update data for the multimedia unit application, the updating of the current firmware being carried out at least to a minimum version.

4. The method according to claim 2, wherein the updated conditional access module firmware and the application update data for the multimedia unit application have a configuration to communicate in accordance with a secured communication protocol between the conditional access module and the application using an algorithm and encryption keys and/or an update of keys for matching the firmware with the multimedia unit application.

5. The method according to claim 1, wherein the maximum available and required minimum versions information of the firmware are transmitted in one or several control messages or in one or several administration messages, said messages being forwarded to the conditional access module.

6. The method according to claim 1, wherein the version information of the firmware is transmitted in sections reserved to a broadcaster in one or several service information tables, said tables being, forwarded to the conditional access module.

7. The method according to claim 1, wherein the stream of encrypted audiovisual data is filtered by an external reception module or by a module integrated with the multimedia unit before processing by the conditional access module.

8. The method according to claim 1, herein the stream of encrypted audiovisual data is filtered and processed by the conditional access module.

9. The method according to claim 1, wherein the operations of downloading and installation of the firmware updating are carried out manually by means of commands transmitted by a user to the multimedia unit in response to error and invitation messages transmitted by the conditional access module.

10. The method according to claim 1, wherein the operations of downloading and installation of the firmware updating are carried out automatically without any user intervention.

11. A system for processing encrypted audiovisual data streams, the system comprising:

a multimedia unit comprising an interface connectable to a conditional access module and a first memory for storing an application program configured to interface with the conditional access module; and a conditional access module connected to the interface of the multimedia unit, the conditional access module comprising a second memory for storing conditional access module firmware, the conditional access module being configured to control access to the encrypted audiovisual data stream;

wherein the conditional access module is configured to perform the steps of:

receiving information indicating a maximum available version of the conditional access module firmware and a minimum required version of the conditional access module firmware, wherein the version information of the firmware is transmitted ciphered with a key known by the conditional access module and not known by the multimedia unit;

decrypting by the conditional access module the version information of the firmware using the key known by the conditional access module;

comparing the minimum required version of the conditional access module firmware to a current version of the conditional access module firmware;

deactivating audiovisual data access control functions and transmitting to the application an error message reporting the necessity of updating the firmware to the multimedia unit if the current version of the conditional access module firmware is less recent than the minimum required version of the conditional access module firmware;

comparing the maximum available version of the conditional access module firmware to the current version of conditional access module firmware;

if the conditional access module firmware is less recent than the maximum available version of the conditional access module firmware, updating the conditional access module firmware according to the steps of transmitting an updating command to the multimedia unit;

receiving an update to conditional access module firmware from the multimedia unit; and installing the update to the conditional access module firmware in the second memory; and wherein the multimedia unit is configured to perform the steps of:

receiving the updating command from the conditional access module;

transmitting an updating request to a management center via a communication network;

receiving an update to the application program and an update to the conditional access module firmware from the management center;

installing the update to the application program in the first memory; and transmitting the update to the conditional access module firmware to the conditional access module;

wherein the multimedia unit and the conditional access module are configured to install the update to the application program and the update to the conditional access module firmware synchronously.

12. The system of claim 11, wherein the conditional access module firmware and the application program are configured such that they will not interoperate if one is updated without updating, the other.

13. The system of claim 11, wherein the conditional access module firmware and the application program are configured to exchange information using a secured communication protocol, the secured communication protocol being configured to match a version of the conditional access firmware to a version of the application program.

14. The system of claim 11, wherein the information indicating a maximum available version of the conditional access module firmware and a minimum required version of the conditional access module firm are is received in a message including a signature that can be verified with a key stored in the conditional access module.

15. The system of claim 11, wherein the multimedia unit is configured to transmitting the updating request to the management center via the communication network under the control of a user of the multimedia unit.

16. The system of claim 11, wherein the multimedia unit is configured to transmitting the updating request to the management center via the communication network automatically without user intervention.

17. The system of claim 11, wherein the update stored by the conditional access module in the second memory corresponds to the maximum available version of the conditional access module firmware.

* * * * *